UNITED STATES PATENT OFFICE.

RICHARD HERZ, OF FRANKFORT-ON-THE-MAIN, GERMANY, ASSIGNOR TO CASSELLA COLOR COMPANY, A CORPORATION OF NEW YORK.

RED VAT DYESTUFFS AND PROCESS OF MAKING SAME.

1,103,004. Specification of Letters Patent. Patented July 7, 1914.

No Drawing. Application filed July 23, 1913. Serial No. 780,698.

*To all whom it may concern:*

Be it known that I, RICHARD HERZ, doctor of philosophy, a subject of the Kingdom of Prussia, and a resident of Frankfort-on-the-Main, in the Province of Hesse-Nassau and Kingdom of Prussia, Germany, have invented some new Red Vat Dyestuffs and Processes of Making Same, of which the following is a full description.

I have found that if diaminoanthraquinones are condensed with alphanaphthoquinone and the products thus formed are then further suitably treated with halogenanthraquinones new valuable vat dyestuffs are produced dyeing vegetable fibers claret-red to deep red shades, fast to washing, light and chlorin.

The dyestuffs obtained probably possess the following general formula:

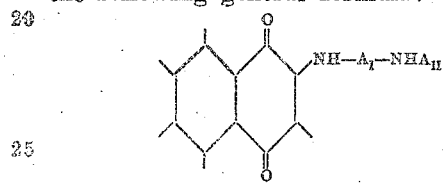

(where $A_I$ means: the residue from one anthraquinone molecule and $A_{II}$ means: the residue from another anthraquinone molecule.)

The process is illustrated by the following example:

Example: 24 kilos 1.5-diaminoanthraquinone, 240 kilos glacial acetic acid, 32 kilos alphanaphthoquinone are stirred together and warmed for 6 to 12 hours at 60° C. to 100° C., and then allowed to cool. The product of condensation which separates nearly quantitatively, is filtered off, washed and dried. 39.5 kilos of this condensation product, 24.5 kilos betachloranthraquinone, 600 kilos nitrobenzene, 8.5 kilos anhydrous sodium acetate, and 0.5 kilos cuprous or cupric chlorid are heated in a suitable vessel for 4 to 6 hours to 160° C. to 200° C.; when cold, the mass is diluted with alcohol; the separated product of condensation is filtered off, washed with alcohol first, and then with water containing some hydrochloric acid, and finally dried.

The substance, when dry, is a dark red powder, soluble with difficulty in hot nitrobenzene with a red color, soluble in concentrated sulfuric acid with a brownish purple color. In an alkaline hydrosulfite solution it forms a brownish red vat, which dyes cotton a claret red shade fast to washing, light and chlorin.

The coloring matter probably has the following constitution:

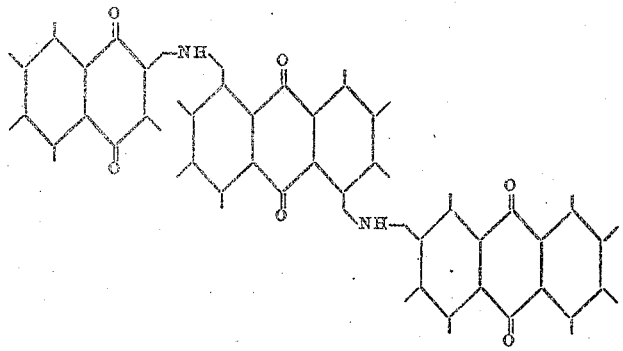

If in this example the betachloranthraquinone is replaced by the alphachloranthraquinone, somewhat bluer tints are obtained, and if the 1.5 diaminoanthraquinone is replaced by the 1.8- or 2.6-diaminoanthraquinone, coloring matters of very similar properties and shades are produced.

Having now particularly described and ascertained the nature of my said invention, and in what manner the same is to be performed, I declare that what I claim is:—

1. The manufacture or production of fast vat dyestuffs of the anthraquinone series, which consists in condensing alphanaphthoquinone with diaminoanthraquinone and treating the products thus obtained with suitable halogenanthraquinones, substantially as described.

2. As a new article of manufacture the fast vat dyestuff of the anthraquinone series, derived from alphanaphthoquinone by condensing it with diaminoanthraquinones and treating the products thus obtained with suitable halogenanthraquinones, having probably the following nucleus:

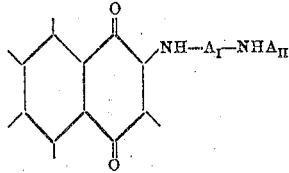

(where $A_I$ means: the residue from one anthraquinone molecule and $A_{II}$: the residue from another anthraquinone molecule,) being in a dry state brick red to dark red powders, insoluble in dilute acids and alkalis with difficulty soluble in the usual organic solvents, forming in an alkaline hydrosulfite solution brownish red vats which dye cotton claret red to deep red shades, fast to washing, light and chlorin, substantially as described.

3. As a new article of manufacture the fast vat dyestuff resulting from alphanaphthoquinone by first condensing it with 1.5-diaminoanthraquinone and treating the product thus obtained with betachloranthraquinone having probably the following chemical constitution:

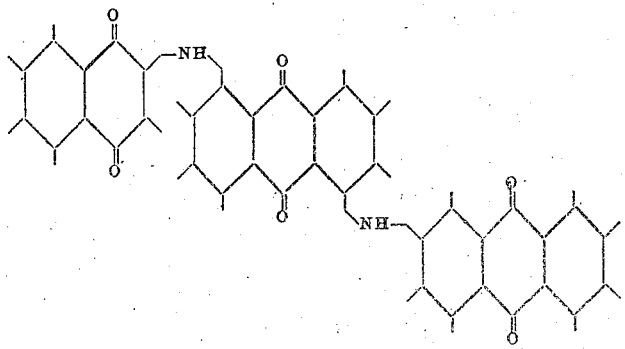

being in a dry state a dark red powder, soluble in concentrated sulfuric acid with a brownish purple color, forming with alkaline hydrosulfite solution a brownish red vat which dyes cotton claret red shades fast to washing, light and chlorin, substantially as described.

In witness whereof I have hereunto signed my name this 8th day of July, 1913, in the presence of two subscribing witnesses.

RICHARD HERZ, PH. D.

Witnesses:
  JEAN GRUND,
  CARL GRUND.